United States Patent [19]

Friedli et al.

[11] Patent Number: 4,518,909
[45] Date of Patent: May 21, 1985

[54] SET VALUE TRANSMITTER FOR A DRIVE REGULATION APPARATUS

[75] Inventors: Paul Friedli, Zurich; Thomas Hinderling, Ebikon; Guntram Begle, Adligenswil, all of Switzerland

[73] Assignee: Inventio AG, Hergiswil, Switzerland

[21] Appl. No.: 551,319

[22] Filed: Nov. 14, 1983

[30] Foreign Application Priority Data

Nov. 19, 1982 [CH] Switzerland ............ 6740/82

[51] Int. Cl.³ ............................................. G05B 13/02
[52] U.S. Cl. .................................. 318/566; 318/434; 318/635
[58] Field of Search ............. 318/566, 432, 434, 635, 318/802, 805, 798; 187/29 MC

[56] References Cited

U.S. PATENT DOCUMENTS

| | | | |
|---|---|---|---|
| 3,665,493 | 5/1972 | Glowzewski et al. | 318/566 |
| 3,911,347 | 10/1975 | Hartung | 318/632 |
| 3,941,987 | 3/1976 | Tack | 364/168 |
| 4,025,837 | 5/1977 | Meier et al. | 318/561 |
| 4,161,013 | 7/1978 | Duriez et al. | 318/779 |
| 4,337,847 | 7/1982 | Schroder et al. | 187/29 MC |

Primary Examiner—David Smith, Jr.
Attorney, Agent, or Firm—Werner W. Kleeman

[57] ABSTRACT

With this set or reference value transmitter which is controlled by a set or reference value clock pulse generator or transmitter regulation of the running-up or acceleration of electric motors, such as asynchronous motors, can be kept under control also in the upper rotational speed ranges of the motor by adapting the displacement path-reference value characteristic curve to the displacement path-actual value characteristic curve. For this purpose the reference value transmitter comprises a correction member, by means of which the displacement path-regulation deviation is supervised in such a way that if the greatest displacement path-regulation deviation associated with the maximum power of the adjusting or positioning members is exceeded, the clock pulse frequency of the reference value clock pulse transmitter is reduced proportionally to the excess. The displacement path-reference values are supplied to the displacement path regulation circuit in correspondingly larger time intervals until the greatest displacement path-regulation deviation is fallen short of, whereupon the reference value transmitter continues to operate with the original clock pulse frequency.

3 Claims, 3 Drawing Figures

SET VALUE TRANSMITTER FOR A DRIVE REGULATION APPARATUS

BACKGROUND OF THE INVENTION

The present invention relates to a new and improved reference value transmitter for a drive regulation apparatus or system, wherein the reference value transmitter is provided with a control store, in which at least permissible jerk or jolt values and threshold values of acceleration are stored and which is connected with a reference value clock pulse generator or transmitter and three integrators for the respective formation of acceleration, velocity and displacement path, and wherein upon the appearance of clock pulses generated by the reference value clock pulse generator or transmitter the output of the third one of such integrators is supplied to a displacement path regulation circuit of the drive regulation apparatus or system.

In U.S. Pat. No. 4,337,847, granted July 6, 1982, a drive control has become known which is concerned with a digital reference value generator of the aforementioned type in which the control store consists of a programmable read-only memory (ROM) which is supplied with set or reference value clock pulse signals or pulses by the clock pulse generator of a digital computer by way of a frequency divider. Upon the presence of reference value clock pulse signals the associated jerk or jolt values are called up and displacement path-reference values are produced by numerical integration having regard to the acceleration limiting values. With such displacement path-reference values, which are dependent only on permissible jerk and acceleration values, it is possible, for example in the case of passenger elevators, for travel curves to be generated by means of which optimal results in relation to travelling comfort and the duration of travel can be achieved.

On the other hand there are certain limitations to the application of such reference value transmitters, according to the kind of drive under consideration. For example, the running-up or acceleration of an asynchronous electric motor in the lower range of rotational speed can be well regulated because of a higher available torque. In the upper rotational speed range, however, the torque falls appreciably with increasing speed, and the motor requires substantially more time to achieve a predetermined rotational speed. It can therefore no longer follow the reference value transmitter hereinbefore described, working as it does with a definite, constant clock pulse frequency, so that the regulation deviation becomes greater and greater, and regulation of the motor is thrown out of gear.

SUMMARY OF THE INVENTION

Therefore, with the foregoing in mind it is a primary object of the invention to eliminate these shortcomings.

Another important object of the present invention is to overcome these drawbacks and to approximate such a reference value transmitter, when operating in the higher range of motor speed, to the running-up high-speed characteristic curve of the motor, so that regulation is achieved over the entire rotational speed range or speed of the motor.

In order to achieve these and other objects of the present invention, which will become more readily apparent as the description proceeds, the regulation deviation is so controlled or monitored that when the greatest regulation deviation associated with the full power or control of the adjusting or positioning members is exceeded, the clock pulse frequency of the reference value generator is diminished proportionally to the excess. The set or reference values are supplied to the regulation circuit in correspondingly greater time intervals, until the greatest regulation deviation is fallen short of, whereupon the reference value transmitter continues to operate with the original clock pulse frequency.

The particular advantages manifested by a reference value generator according to the present invention are that even with simple, inexpensive motors, as for example those used in elevator drives, optimal movement or travel curves in relation to travel comfort and minimum journey time can be achieved. A further advantage, achieved by the approximation of the course of the set or reference value to the running-up or high-speed characteristic curve of the motor, is that the motor is not forced in the higher speed range, to follow the reference value generator, so that motors of smaller power or output can be employed.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
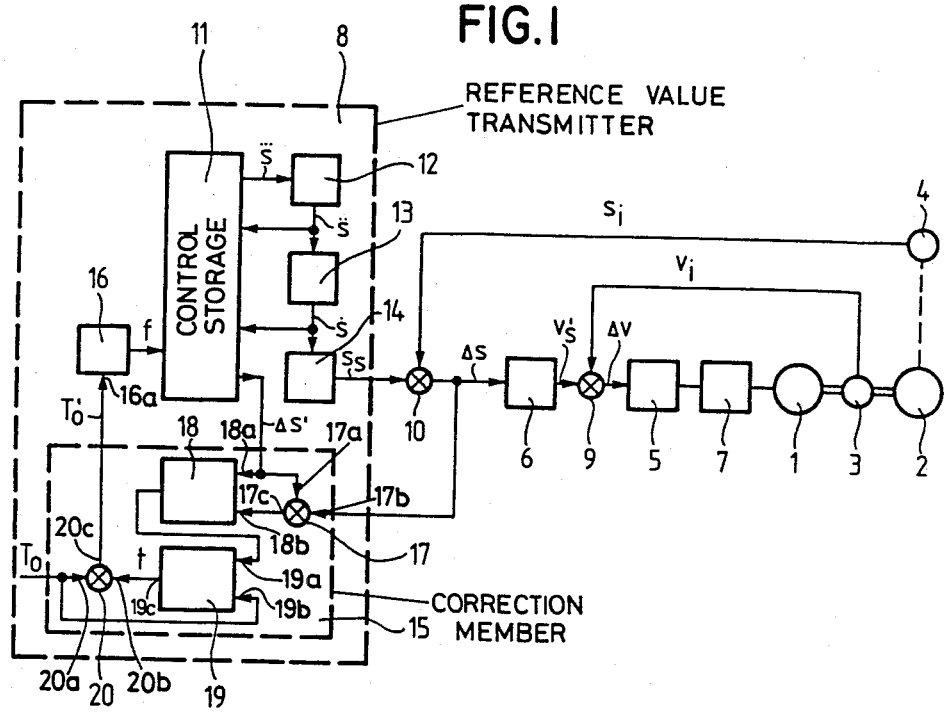
FIG. 1 is a schematic representation of the reference value transmitter according to the present invention, connected to a drive regulation apparatus or system.
Figure 2:
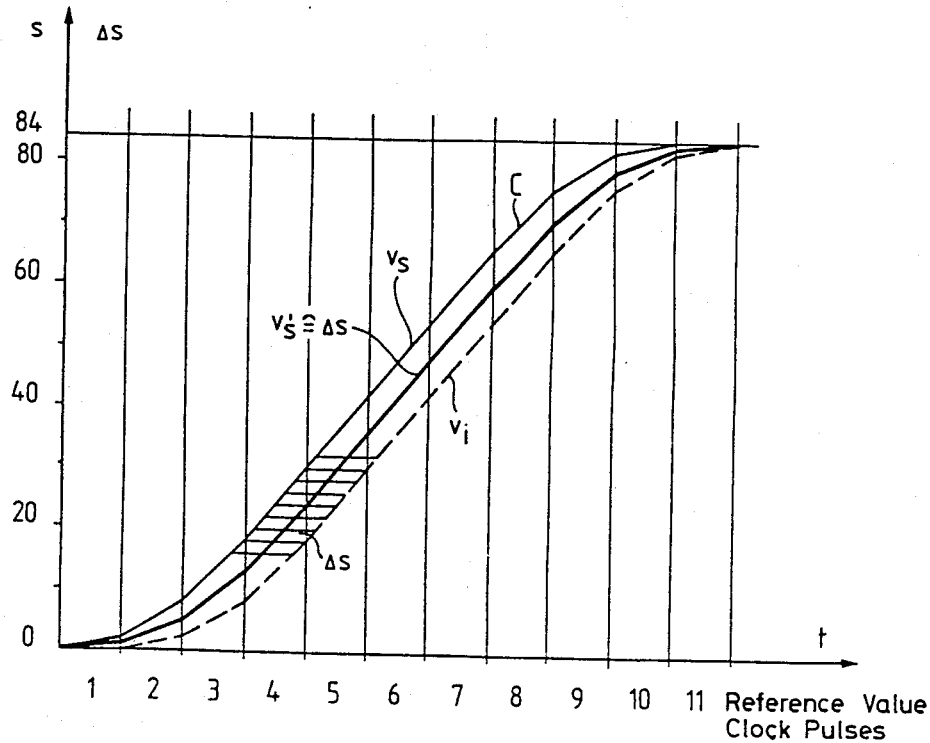
FIG. 2 is a diagram against time of the course of the displacement path-reference values $S_S$ and of the displacement path-actual values $S_i$, as well as of the corrected displacement path-reference values $S_S$, during acceleration up to a maximum velocity.

Describing not the drawings, in FIG. 1 a drive control apparatus or installation comprises an electric motor 1, a load 2 to be driven by it, a velocity actual value transmitter 3, a displacement path actual value transmitter 4, a velocity regulator 5, a displacement path or path regulator 6, an adjusting or positioning member 7 and a set or reference value transmitter 8. The velocity actual value transmitter 3 is coupled to the electric motor 1 and is connected to a first subtractor 9 for the formation of the velocity regulation deviation $\Delta V$. The displacement path actual value transmitter 4 is connected to a second subtractor 10 for the formation of the displacement path or path-regulation deviation $\Delta S$ and is so connected to the load 2 that changes in position can be directly detected. The electric motor 1 may, for example, be an asynchronous motor, in which case the adjusting or positioning member 7 consists of controlled thyristors disposed in the stator circuit.

The set or reference value generator 8 consists of a control store or storage 11, three integrators 12, 13 and 14 generating the acceleration $\ddot{S}$, the velocity $\dot{S}$ and the displacement path $S_S$, a correction member or circuit 15 and a reference value clock pulse generator or transmitter 16, for example in the form of a function generator with a controllable frequency. In the control store 11 permitted jerk or jolt values are stored and also threshold values of the acceleration and of the velocity, so that the jerk values are supplied to the first integrator 12 and the generated acceleration and velocity values are fed back to the control store 11 for the purpose of comparison with the threshold values. The output of the third integrator 14 is connected with the second subtractor 10 for the formation of the displacement path-regulation deviation $\Delta S$. In the control store 11 there is furthermore stored at a storage place or storage means thereof a threshold value $\Delta S'$ of the displacement path-regulation deviation $\Delta S$ which corresponds to the greatest displacement path-regulation deviation which is present at full power of the thyristors of the adjusting or positioning member 7, and which is fed to an input 17a of the subtractor 17 and to an input 18a of a divider 18 of the correction member 15. The other input 18b of the divider 18 is connected to the output 17c of the subtractor 17, the second input 17b of which is connected with the output 10a of the subtractor 10 for the formation of the displacement path-regulation deviation $\Delta S$. The correction member 15 further comprises a multiplier 19 and an adder 20, wherein one input 19a of the multiplier 19 is connected to the output 18c of the divider 18 and the other input 19b with an input 20a of the adder 20, and where the time $T_o$ of a period of the clock pulse is supplied to the latter two inputs 19b and 20a, for example in the form of a constant voltage. The output 19c of the multiplier 19 is connected to the other input 20b of the adder 20, and the output 20c thereof is connected to the input 16a of the reference value clock pulse transmitter 16.

In a preferred embodiment the set or reference value transmitter 8 as well as the regulators 5, 6 and the subtractors 9, 10 are integrated into a microcomputer system, wherein the control store 11 is a programmable read-only memory (ROM) and the functions of the integrators 12, 13, 14, of the correction member 15, and of the subtractors 9, 10 are performed by the arithmetic count of a microprocessor.

The set or reference value generator hereinbefore described operates as follows.

With the starting signal, for example for the movement of an elevator cabin, clock pulses are generated by the reference value clock pulse generator or transmitter 16 and are supplied to the control store 11. During a period of the clock pulse signal which will also be referred to as the set or reference value clock pulse, the associated jerk or jolt value $\dot{\ddot{S}}$ is taken from the control store 11 and is supplied to the first integrator 12. By means of continuous numerical integration determination takes place in the integrators 12, 13, 14 of the acceleration $\ddot{S}$, the velocity $\dot{S}$ and the displacement path $S_S$, and when the threshold values of acceleration or velocity have been reached, in each case a new jerk value $\dot{\ddot{S}}$ is called up and supplied to the first integrator 12. The velocity threshold values have target or reference paths allocated to them, whereby a reference value series for the deceleration phase, determined by the velocity value at any time, is generated as described in the aforementioned U.S. Pat. No. 4,337,847, when there is conformity between a possible target path of the elevator cabin and the presence of a stop command. In this way, for example, and according to the following table, the jerk values $\dot{\ddot{S}} = +4$ is called up during the reference value clock pulses 1, 2 and 3 and after reaching the acceleration threshold value $\ddot{S} = 12$, the jerk value $\dot{\ddot{S}} = 0$ is called up. When the criteria appear for initiating the deceleration phase during the reference value clock pulse 5 and reaching the velocity threshold value $\dot{S} = 42$ of the reference value series, the jerk values $\dot{\ddot{S}} = -4$ are called up. If the criteria only appear during the reference value clock pulse 6, the new jerk value $\dot{\ddot{S}} = -4$ is called up on reaching the velocity threshold value $\dot{S} = 54$ of the following reference value series B.

| Ref. value series | Ref. value clock pulses | | | | | | | | | |
|---|---|---|---|---|---|---|---|---|---|---|
| | 1 | 2 | 3 | 4 | 5 | 6 | 7 | 8 | 9 | 10 |
| Jerk $\dot{\ddot{S}}$ | | | | | | | | | | |
| A | +4 | +4 | +4 | [0] | 0 | [−4] | −4 | −4 | −4 | −4 |
| B | +4 | +4 | +4 | 0 | 0 | 0 | [−4] | −4 | −4 | −4 |
| C | +4 | +4 | +4 | 0 | 0 | 0 | 0 | −4 | −4 | −4 |
| Accel $\ddot{S}$ | | | | | | | | | | |
| A | 4 | 8 | [12] | 12 | 12 | 8 | 4 | 0 | −4 | −4 |
| B | 4 | 8 | 12 | 12 | 12 | 12 | 8 | 4 | 0 | −4 |
| C | 4 | 8 | 12 | 12 | 12 | 12 | 12 | 8 | 4 | 0 |
| Vel. $\dot{S}$ | | | | | | | | | | |
| A | 2 | 8 | 18 | 30 | [42] | 52 | 58 | 60 | 58 | 52 |
| B | 2 | 8 | 18 | 30 | 42 | [54] | 64 | 70 | 72 | 70 |
| C | 2 | 8 | 18 | 30 | 42 | 54 | [66] | 76 | 82 | 84 |
| Path S | | | | | | | | | | |
| A | 1 | 6 | 19 | 43 | 79 | 126 | 181 | 240 | 299 | 354 |
| B | 1 | 6 | 19 | 43 | 79 | 127 | 186 | 253 | 324 | 395 |
| C | 1 | 6 | 19 | 43 | 79 | 127 | 187 | 258 | 337 | 420 |

Figure 3:
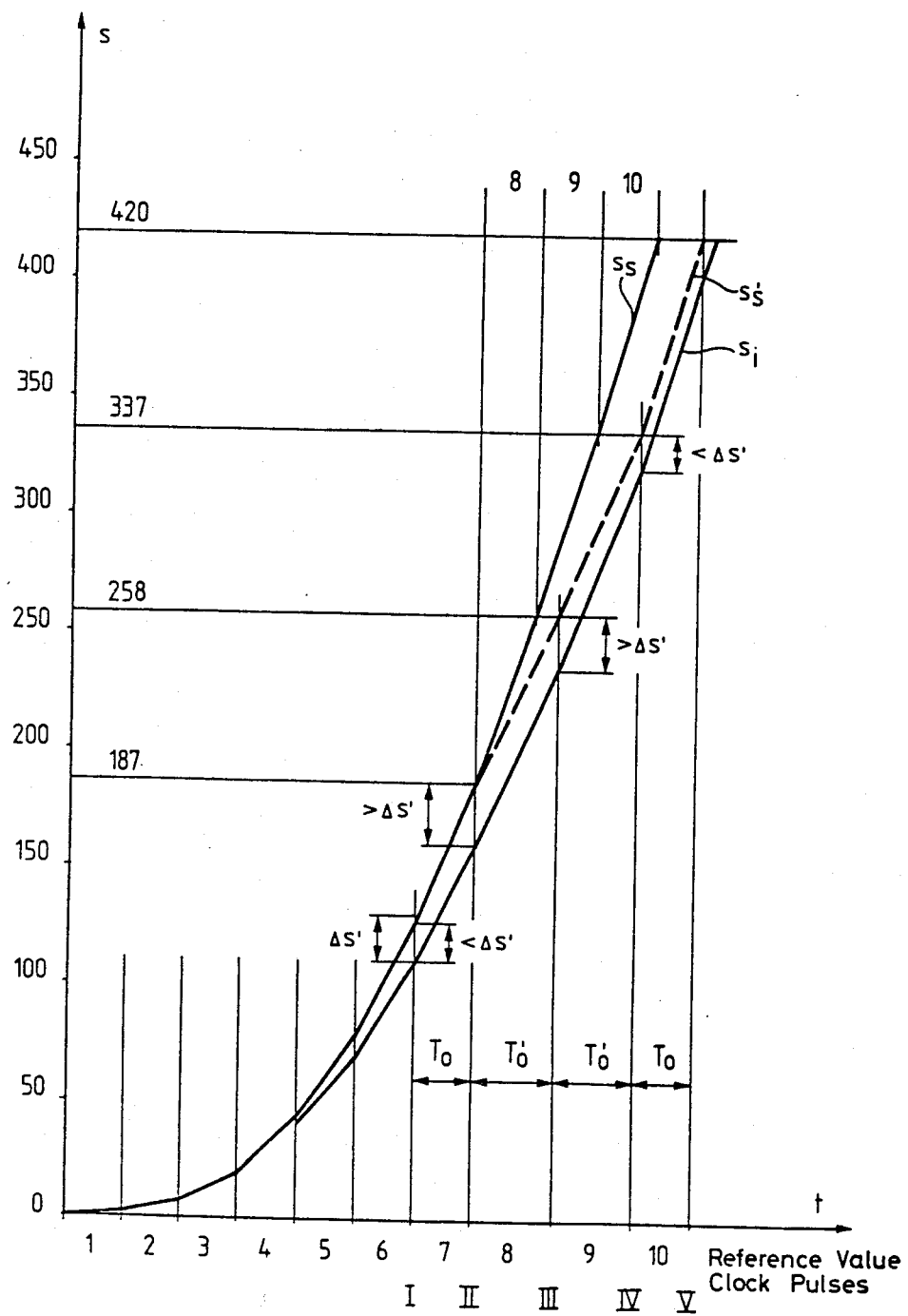
FIG. 3 is a diagram of the course, against time, of velocity reference values and actual values, $V_S$ $V_i$ as well as the regulation deviations $\Delta S$ resulting therefrom during acceleration to a maximum velocity.

It may now be assumed that in the first instance no stop command is received and the drive is accelerated to the revolutions corresponding to the rated velocity $V_{max}$, where the rated velocity $v_{max}$ is, for example, reached with the reference value series C at $\dot{S} = 84$, which is characterized by the velocity threshold value $\dot{S} = 66$ (Table and FIG. 3). Here the jerk value $\dot{\ddot{S}} = -4$ is called up during the reference value clock pulses 8, 9 and 10 and the displacement path-reference values $S = 258, 337$ and $420$ are formed, (Table and FIG. 3). As mentioned at the outset, the electric motor 1 cannot follow the reference value transmitter 8 in the upper range of its revolutions or rotational speed, when it operates all the time with a definite, constant pulse frequency f. Assuming that the displacement path-regulation deviation $\Delta S$ during reference value clock pulse 6 is still smaller than the threshold value $\Delta S'$, so that the output of the displacement path-reference value $S = 187$ for the reference value clock pulse 7 appears after the time $T_o$ of a reference value pulse corresponding to the clock pulse frequency f (Time I and II, FIG. 3). Assume further that the threshold value $\Delta S'$ is exceeded at time II. During this a difference is formed in the subtractor 17 between the displacement path-regulation deviation $\Delta S$ and the threshold value $\Delta S'$ and a percentage deviation from the threshold value $\Delta S'$ is worked out in the divider 18 by division of this difference with the threshold or limiting value $\Delta S'$. This percentage deviation is fed to the multiplier 19, by means of which a time deviation t is formed by multiplication by the time $T_o$ of a reference value clock pulse.

In the adder 20 a corrected time $T_o'$ is obtained from this time deviation and the time $T_o$, the reciprocal value of which is supplied to the reference value clock pulse transmitter 16 as an input voltage, where the pulse frequency f is reduced proportionally to this input voltage and the output of the displacement path-reference value $S=258$ for the reference value clock pulse 8 only takes place after the corrected time $T_o'$ (Time III, FIG. 3). If at the point in time III the regulation deviation is still greater than the threshold value $\Delta S'$, then the displacement path-reference value $S=337$ for the reference value clock pulse 9 is also provided only after a corrected time $T_o'$ (Time IV, FIG. 3). If the regulation deviation falls at time IV beneath the threshold value $\Delta S'$, then the reference value transmitter 16 again operates with the original clock pulse frequency f, where the displacement path-reference value $S=420$ for the reference value clock pulse 10 is provided after the original time $T_o$ (Time V, FIG. 3). In this way a characteristic line $S_S'$ of the displacement path-reference value is generated, which is so approximated to the characteristic curve of the displacement path-actual value $S_i$ in such a way that regulation is provided over the whole range of rotational speeds of the electric motor 1. The displacement path-regulation deviation characteristic curve $\Delta S$ formed by the displacement path reference and actual values is supplied to the drive as a travel curve $V_S'$ where, in accordance with FIG. 3, the displacement path-regulation deviation characteristic curve $\Delta S$, also derived from the integral of the difference of the velocity reference and actual values $V_S$, $V_i$, has nearly the same form as the velocity reference value characteristic curve $V_S$ corresponding to the reference value series C of the above Table.

The figures shown in the above table for jerk, acceleration, velocity and path are comparative figures stored in the form of binary numbers; they therefore do not correspond to the actual values of the relevant physical magnitudes.

While there are shown and described present preferred embodiments of the invention, it is to be distinctly understood that the invention is not limited thereto, but may be otherwise variously embodied and practiced within the scope of the following claims. Accordingly,

What we claim is:

1. A reference value transmitter for a drive control system, comprising:
   a control store in which there are stored at least permissible jerk values and threshold values of acceleration;
   a reference value clock pulse generator to which said control store is connected and operating at a predetermined clock pulse frequency;
   said reference value clock pulse generator having an input;
   three integrators for the respective formation of acceleration, velocity and displacement path;
   said three integrators being connected in circuit with said control store;
   a displacement path regulation circuit to which an output of the integrator for the displacement path is supplied, said output constituting a displacement path-reference value upon appearance of clock pulse signals from said reference value clock pulse generator;
   a correction member having a first input, a second input and an output;
   said correction member being connected by said first input with said control store and by said second input with said displacement path regulation circuit;
   said correction member being connected at said output to said input of said reference value clock pulse generator;
   said displacement path regulation circuit supplying a displacement path-regulation deviation to the second input of said correction member;
   said control store supplying a threshold value of said displacement path-regulation deviation to the first input of said correction member; and
   said correction member altering the clock pulse frequency of said reference value clock pulse generator when said threshold value is exceeded and proportional to an excess defined by the amount that the displacement path-regulation deviation exceeds the threshold value.

2. The reference value transmitter as defined in claim 1, wherein:
   said displacement path regulation circuit contains an adjusting member;
   said control store comprises storage means in which the threshold value of the displacement path-regulation deviation can be stored; and
   said threshold value corresponds to the greatest displacement path-regulation deviation which occurs with maximum power of the adjusting member of the displacement path regulation circuit.

3. The reference value transmitter as defined in claim 1, wherein:
   said correction member comprises:
      a subtractor having a first input, a second input and an output;
      a divider having a first input, a second input and an output;
      a multiplier having a first input, a second input and an output;
      an adder having a first input, a second input and an output;
      a further subtractor connected with said integrator for the displacement path and said displacement path regulation circuit;
      said further subtractor forming the displacement path-regulation deviation and having an output;
      the first input of said subtractor of the correction member being connected with the first input of said divider and with said control store;
      the second input of said subtractor of the correction member being connected with the output of said further subtractor forming the displacement path-regulation deviation;
      the output of said subtractor of said correction member being connected to the second input of said divider;

the output of said divider being connected to the first input of said multiplier;

said adder being connected by means of its first input with the output of the multiplier and by means of its second input with the second input of said multiplier and by means of its output with the input of said reference value pulse generator; and a constant amount proportional to the duration of a reference value-clock pulse can be supplied to the second input of said adder connected to the second input of said multiplier.

* * * * *